United States Patent [19]
Kikuchi et al.

[11] Patent Number: 5,321,407
[45] Date of Patent: Jun. 14, 1994

[54] METHOD FOR ESTIMATING RELATIVE SPEED BETWEEN VEHICLE AND OBJECTIVE OBSTACLE

[75] Inventors: Hayato Kikuchi; Yasuhiko Fujita; Toshiaki Arai; Yoshikazu Tsuchiya; Makoto Sato; Kunio Nanno, all of Wako, Japan

[73] Assignee: Honda Giken Kogyo Kabushiki Kaisha, Tokyo, Japan

[21] Appl. No.: 996,825

[22] Filed: Dec. 28, 1992

[30] Foreign Application Priority Data

Dec. 27, 1991 [JP] Japan ................... 3-347496
Apr. 10, 1992 [JP] Japan ................... 4-090250

[51] Int. Cl.$^5$ .............................. G01S 13/93
[52] U.S. Cl. ........................... 342/70; 342/71
[58] Field of Search .................... 342/70, 71, 72

[56] References Cited

U.S. PATENT DOCUMENTS

| | | | |
|---|---|---|---|
| 3,760,415 | 9/1973 | Holmstrom et al. | 342/59 |
| 3,992,709 | 11/1976 | Watanabe et al. | 342/109 |
| 4,016,566 | 4/1977 | Fujiki | 342/52 |
| 4,146,891 | 3/1979 | Fujiki et al. | 342/71 |
| 4,537,271 | 8/1985 | Ito et al. | 342/71 X |
| 4,926,171 | 5/1990 | Kelley | 342/29 X |
| 5,016,017 | 5/1991 | Kodera et al. | 342/106 |
| 5,045,856 | 9/1991 | Paoletti | 342/70 |
| 5,181,038 | 1/1993 | Asbury et al. | 342/70 |

FOREIGN PATENT DOCUMENTS

| | | |
|---|---|---|
| 0473866A2 | 3/1992 | European Pat. Off. . |
| WO80/01782 | 9/1980 | PCT Int'l Appl. . |
| 1244308 | 8/1971 | United Kingdom . |
| 1305181 | 1/1973 | United Kingdom . |

OTHER PUBLICATIONS

Radar Handbook pp. 8.23–8.40.
Proceedings of the 1989 International Symposium, pp. 596–601, 1989.

*Primary Examiner*—John B. Sotomayor
*Attorney, Agent, or Firm*—Armstrong, Westerman, Hattori, McLeland & Naughton

[57] ABSTRACT

In estimating the relative speed between a vehicle and an objective obstacle, a plurality of objective obstacle data are labeled, and an objective obstacle data preestimated on the basis of the past objective data is compared with an objective obstacle newly provided, thereby judging whether or not there is the same obstacle for every label. With regard to the objective obstacle data decided as being the same, the amount of variation in distance is determined for every label by comparison of the last data and the now data and divided by a sampling time to provide a relative speed. Thus, noise data can be eliminated to reliably provide a relative speed between a subject vehicle and an existent objective obstacle.

3 Claims, 15 Drawing Sheets

FIG.13A
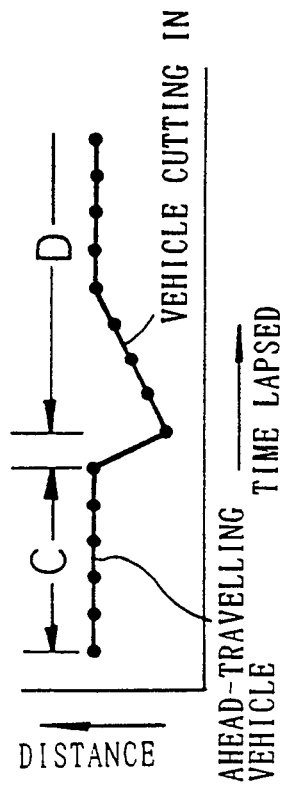
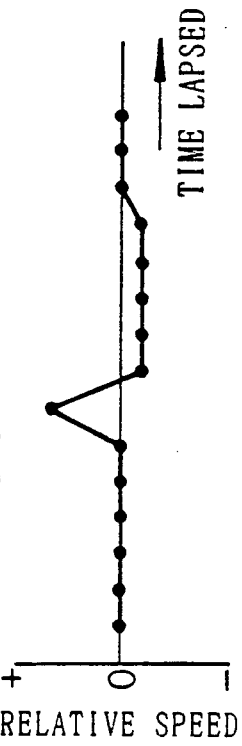
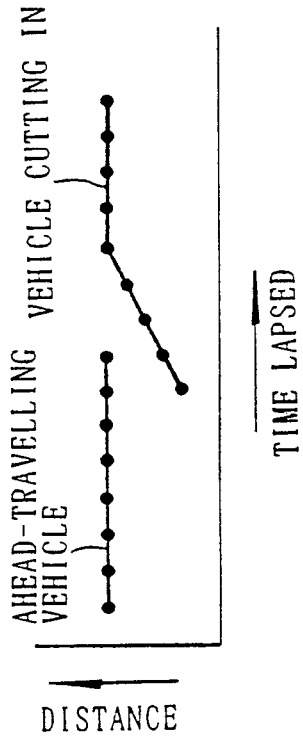
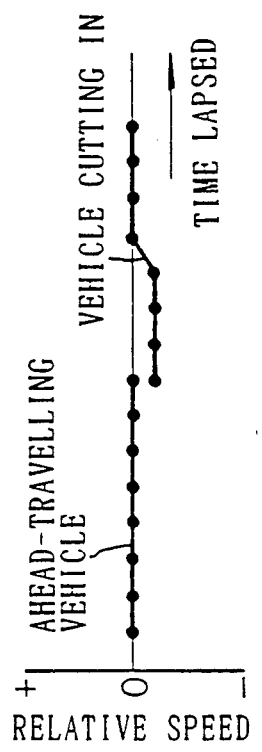

METHOD FOR ESTIMATING RELATIVE SPEED BETWEEN VEHICLE AND OBJECTIVE OBSTACLE

BACKGROUND OF THE INVENTION

1. Field of The Invention

The present invention relates to a method for estimating the relative speed between a vehicle and an objective obstacle.

2. Description of The Related Art

A collision preventing system for a vehicle is known, for example, from Japanese Patent Publication No. 4700/86, in which the distance between a subject vehicle and an objective obstacle is measured by a distance measuring unit, and a brake device is operated in accordance with the distance between the subject vehicle and the objective obstacle.

In the above collision system for the vehicle, it is necessary to correctly obtain the relative speed between the subject vehicle and the objective obstacle. However, it is inevitable that noise data are incorporated into objective obstacle data obtained in the distance measuring unit.

In the above prior art collision preventing system for the vehicle, the distance is calculated on the basis of the time between the transmission of a pulse signal and the reception of a first reflection from the objective obstacle in response to the pulse signal and the relative speed is estimated from a variation in such calculated distances. This causes four problems:

First when noises, due to the reflection from a road surface and a matter suspended in the air, are received in a condition in which another vehicle, as an objective obstacle, is travelling ahead of the subject vehicle as shown in FIG. 12A, the noises A and B cannot be distinguished from the signals of the ahead-travelling vehicle, as shown in FIG. 12D. This causes a dispersion in relative speed between the subject vehicle and the ahead-travelling vehicle, as shown in FIG. 12E, notwithstanding that there is actually no variation in relative speed between the subject vehicle and the ahead-travelling vehicle. Therefore, it is impossible to correctly determine the behaviour of the ahead-travelling vehicle, thereby causing misoperation.

Second, when another vehicle has cut in between the ahead-travelling vehicle and the subject vehicle, as shown in FIG. 13A, the distance between the subject vehicle and the ahead-travelling vehicle is measured in a section C, while the distance between the subject vehicle and the cutting-in vehicle is measured in a section D from the middle (see FIG. 13D). In such a transition, the relative speed is disordered, as shown in FIG. 13E and, hence, the behavior of the ahead-travelling vehicle and the subject vehicle cannot be correctly confirmed, causing misoperation.

Third, suppose a condition in which a four-wheel vehicle is travelling ahead of a motorcycle which is in turn, travelling ahead of the subject vehicle, as shown in FIG. 14A, where a higher attention should be directed to the four-wheel vehicle, constituting a dangerous situation for collision. In this condition, the presence of the ahead-travelling four-wheel vehicle cannot be detected until the motorcycle runs away from between the subject vehicle and the ahead-travelling four-wheel vehicle, as shown in FIG. 14C. Hence, when the motorcycle runs past the four-wheel vehicle as a result of a speed reduction of the four-wheel vehicle there is a possibility that the judgement of collision of the vehicle, against the ahead-travelling four-wheel vehicle, is retarded.

Fourth, when the subject vehicle is travelling on a curved road, having corner reflectors $E_1$ to $E_8$, such reflectors $E_1$ to $E_8$ are sequentially detected, as shown in FIG. 15D. Therefore, not only the behavior of the ahead-travelling vehicle cannot be detected, but also there is the possibility of a misoperation due to the dispersion in relative speed, as shown in FIG. 15E.

SUMMARY OF THE INVENTION

Accordingly, it is an object of the present invention to provide a method for estimating the relative speed between a subject vehicle and an objective obstacle, wherein the above-described problems can be overcome.

To achieve the above object, according to a first embodiment of the present invention, there is provided a method for estimating the relative speed between a vehicle and an objective obstacle, the vehicle being equipped with a distance measuring unit which comprises a transmitting and receiving section capable of transmitting a signal toward the objective obstacle and receiving a reflected signal from the objective obstacle, and a calculating section for calculating the distance between the subject vehicle and the objective obstacle on the basis of the time between the signal transmission and the reception of the reflected signal, the method comprising the steps of labeling a plurality of objective obstacle data provided in the distance measuring unit, comparing an objective obstacle data, preestimated on the basis of the past objective obstacle data, with an objective obstacle data, newly measured, and thereby judging whether or not there is the same obstacle for every label, determining the amount of variation in distance for every label by comparing the last data with current or new data with regard to the objective obstacle data identified as being the same and dividing such amount of variation in distance by a sampling time to provide a relative speed.

With the above first feature, noise data can be eliminated, and the relative speed can be reliably obtained with respect to the objective obstacle.

According to the second embodiment of the present invention, the signal transmitted toward the objective obstacle is a pulse signal having a predetermined extent and transmitted toward the objective obstacle, and an objective obstacle data is calculated for every reflected signal received within a given sampling time, as a result of a single transmission of the pulse signal, the given sampling time being set shorter than a cycle of transmission of the pulse signal; such objective obstacle data is labeled, and the amount of variation in distance is divided by the cycle of transmission of the pulse signal to provide a relative speed.

In such second embodiment, the relative speed between the subject vehicle and each of a plurality of objective obstacles can be obtained by a single transmission of the pulse signal, thereby overcoming the problems associated with the prior art in which only the relative speed between the subject vehicle and the single obstacle can be obtained by the single transmission of the pulse signal.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 5 illustrate a first embodiment of the present invention, wherein:

FIG. 1 is a diagram illustrating the arrangement of a vehicle;

FIG. 2 is a longitudinal sectional side view of an electric-powered hydraulic pressure producing means of the first embodiment;

FIG. 3 is a block diagram illustrating an arrangement of an essential portion of an electronic control unit of the instant invention;

FIG. 4 is a diagram of detection data of objective obstacles on X, Y, coordinates;

FIG. 5 is a diagram of development of estimated positions of objective obstacles on coordinates;

FIGS. 7 to 11 illustrate a second embodiment of the present invention, wherein

FIG. 7 is a flow diagram illustrating the third embodiment;

FIG. 8 is a flow diagram illustrating operation timing for each of the components of the distance measuring unit; and FIGS. 9 to 11 are flow charts illustrating a procedure of judgment in the judging device;

FIGS. 13A to 13C are diagrams illustrating characteristics obtained through the method of the present invention when a vehicle cuts in;

FIGS. 13D to 13E are diagrams similar to Gigs. 13A to 13C but of the prior art;

DESCRIPTION OF THE PREFERRED EMBODIMENTS

A first embodiment of the present invention will now be described in connection with FIGS. 1 to 5.

Figure 1:
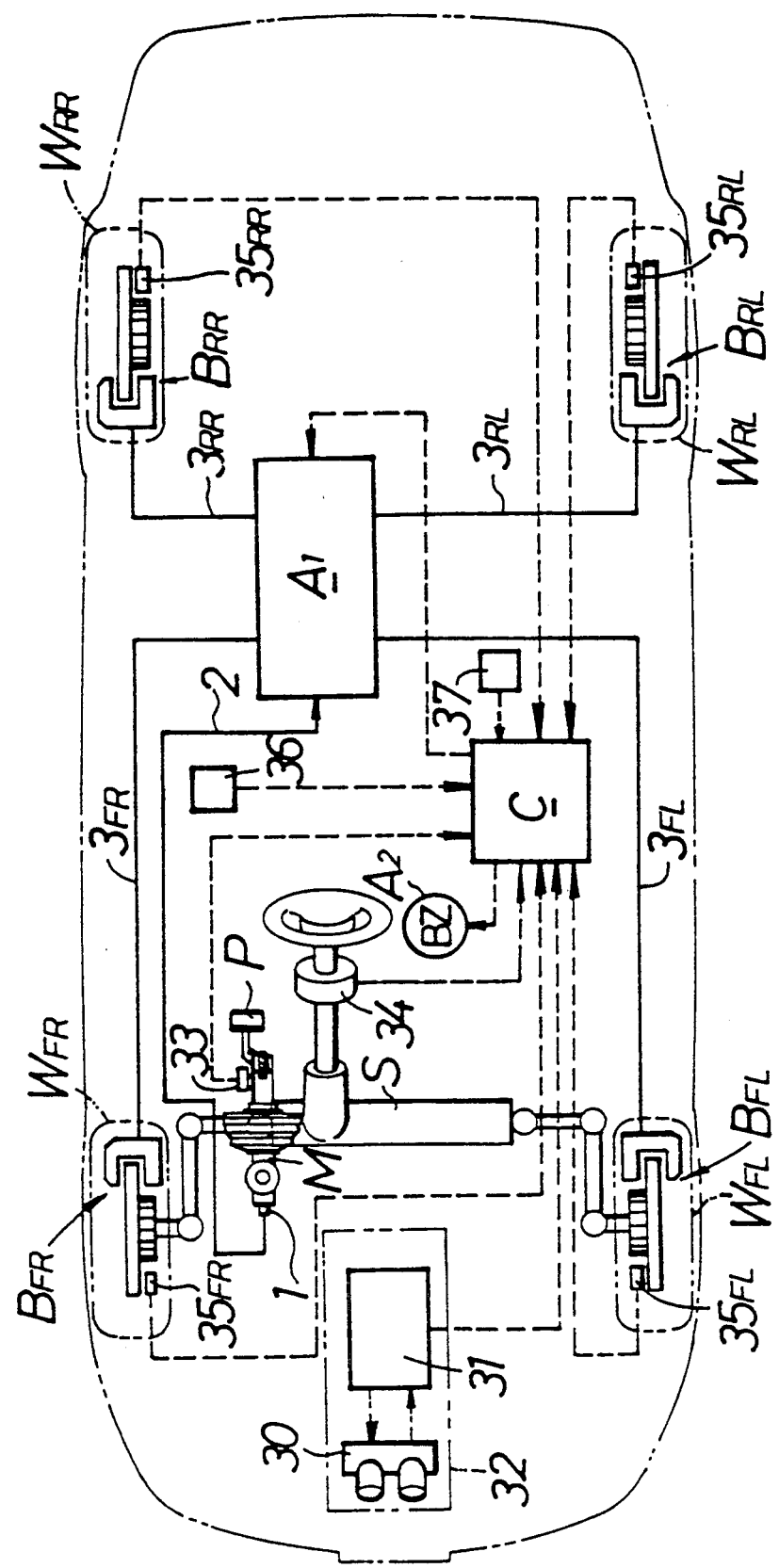

Referring first to FIG. 1, in an automobile vehicle V, a left from wheel disk brake $B_{FL}$ and a right front wheel disk brake $B_{FR}$ are mounted on a left front wheel $W_{FL}$ and a right front wheel $W_{FR}$ connected to a steering device S. A left rear wheel disk brake $B_{RL}$ and a right rear wheel disk brake $B_{RR}$ are mounted on a left rear wheel $W_{RL}$ and a right rear wheel $W_{RR}$, respectively.

An oil passage 2 is connected to an output port 1 of master cylinder M for delivering hydraulic braking pressure, corresponding to depressing operation of brake pedal P. An electric-powered hydraulic pressure producing means $A_1$, as an actuator, is interposed between the oil passage 2 and oil passages $3_{FL}$, $3_{FR}$, $3_{RL}$ and $3_{RR}$, independently connected to the disk brakes $B_{FL}$, $B_{FR}$, $B_{RL}$ and $B_{RR}$, respectively. The electric-powered hydraulic pressure producing means $A_1$ is shiftable between an inoperative state, in which the passage 2 and each of the oil passages $3_{FL}$, $3_{FR}$, $3_{RL}$ and $3_{RR}$ are put in communication with each other, for permitting hydraulic braking pressure from the master cylinder M to be applied to each of the disk brakes $B_{FL}$, $B_{FR}$, $B_{RL}$ and $B_{RR}$, and an operative state in which communication between the oil passage 2 and each of the oil passages $3_{FL}$, $3_{FR}$, $3_{RL}$ and $3_{RR}$ is cut off, and hydraulic pressure produced by the electric-powered hydraulic pressure producing means $A_1$ is applied to each of the disk brakes $B_{FL}$, $B_{FR}$, $B_{RL}$ and $B_{RR}$.

Figure 2:
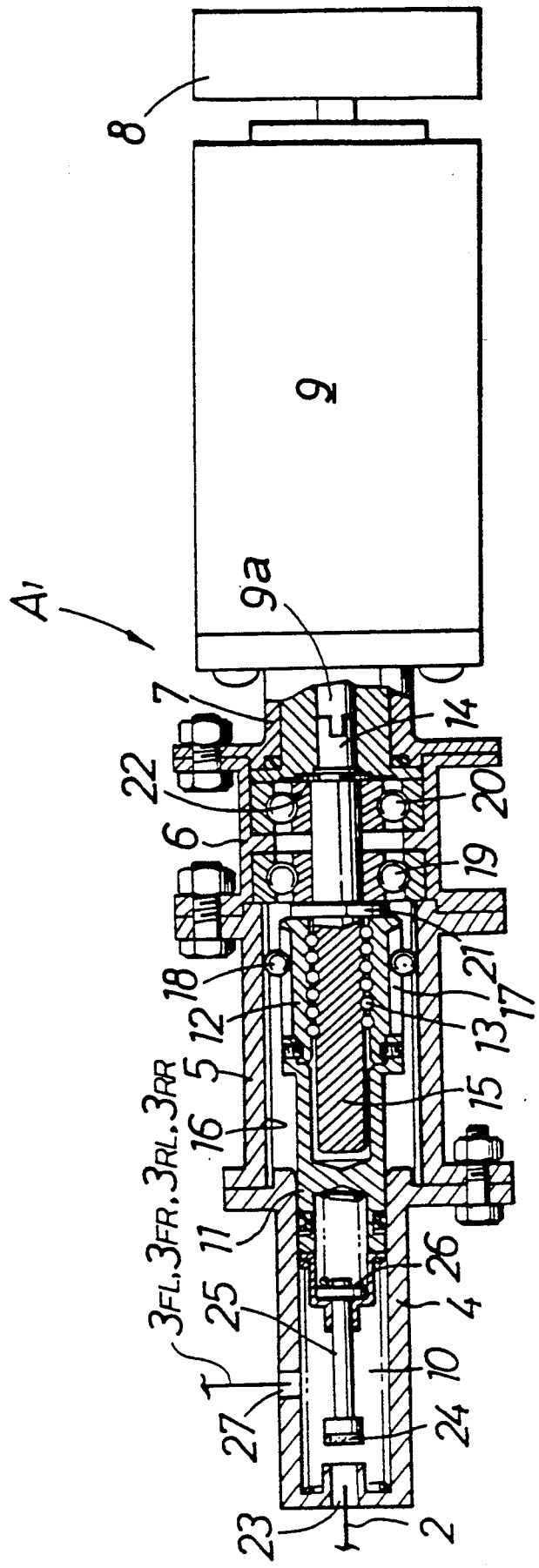

Referring to FIG. 2, the electric-powered hydraulic pressure producing means $A_1$ comprises a cylinder 4, formed a bottomed cylindrical shape, with its tip end closed. A cylindrical guide 5 is coaxially connected to a rear end of the cylinder 4. A cylindrical support 6 is coaxially connected to the cylindrical guide 5. A cylindrical connecting member 7 is coaxially connected to the cylindrical support 6. A motor 9, having an encoder 8, is coaxially connected to the cylindrical connecting member 7. A piston 11 is slidably received in the cylinder 4 to define a pressure chamber 10 between the piston 11, itself, and the closed end of the cylinder 4. A cylindrical nut member 12 is disposed within the cylindrical guide 5 for inhibited rotation about an axis of the nut member 12, and is coaxially connected to a rear end of the piston 11. A rotary shaft 15 is coupled to the nut member 12, through a ball screw 13, and connected to an output shaft 9a of the motor 9 through an Oldham's joint 14.

A plurality of axially extending grooves 16 and 17 are provided in an inner surface of cylindrical guide 5 and an outer surface or the nut member 12, respectively, in alignment with each other. A ball 18 is received in each of aligned grooves 16 and 17 thereby inhibiting the rotation of the nut member 12 and, thus, the piston 11, about an axis thereof. The rotary shaft 15 is rotatably carried in the cylindrical support 6 with a pair of ball bearings 19 and 20 interposed therebetween. A collar 21 is provided on the rotary shaft 15 and extends radially outwardly. A retaining ring 22 is mounted around the rotary shaft 15. Axial movement of the rotary shaft 15 is inhibited by engagement of the collar 21 and the retaining ring 22 with axial outer ends of inner peripheries of the ball bearings 19 and 20, respectively.

The cylinder 4 is provided at its forward end with a valve bore 23 leading to oil passage 2 connected to master cylinder M. A valve member 24, for opening and closing the valve bore 23, is retained on the piston 11. More specifically, a rod 25 is retained at its rear end on the front end of the piston 11 for axial movement in a predetermined range. The valve member 24 is mounted on the front end of the rod 25. A spring 26 is compressed between the rod 25 and the piston 11 for biasing the rod 25 and, thus, the valve member 24 tow the valve bore 23.

The cylinder 4 is provided with an output port 27 which leads to the pressure chamber 10. The oil passages $3_{FL}$, $3_{FR}$, $3_{RL}$ and $3_{RR}$, independently leading to the disk brakes $B_{FL}$, $B_{FR}$, $B_{RL}$ and $B_{RR}$, are connected to the output port 27.

In the electric-powered hydraulic pressure producing means $A_1$, the piston 11 is reciprocally axially moved by means of the ball screw 13, in response to forward and reverse rotation of the motor 9. When the piston 11 is moved forwardly, the valve bore 23 is closed by the valve member 24, and hydraulic pressure, corresponding to the amount of piston 11 movement, is generated in the pressure chamber 10 and applied to each of the disk brakes $B_{FL}$, $B_{FR}$, $B_{RL}$ and $B_{RR}$.

Referring again to FIG. 1, a distance measuring unit 32 is mounted at a front portion of the automobile vehicle. The distance measuring unit 32 comprises a transmitting and receiving section 30 capable, respectively, of transmitting a signal forwardly from the vehicle and receiving a reflected signal from an objective obstacle, and a calculating a section 31 for calculating distance between the subject vehicle and the objective obstacle based on the time between the signal transmission and the reception of the reflected signal. The distance measuring unit 32 is capable of scanning in a widthwise direction of the vehicle to detect the distance from the subject vehicle to the objective obstacle in a given range in the widthwise direction of such vehicle.

The brake pedal P is provided with a depression force sensor 33, and the steering device S is provided with a steering angle sensor 34. Wheel speed sensors $35_{FL}$, $35_{FR}$, $35_{RL}$ and $35_{RR}$ are mounted to the wheels for independently detecting each wheel speed, respectively. Signals from the sensors 33, 34, $35_{FL}$, $35_{FR}$, $35_{RL}$ and $35_{RR}$, and the distance measuring unit 32, are supplied into an electronic control unit C. Further, signals from a yaw rate sensor 36 for detecting a yaw rate of the vehicle and from vigilance degree detector 37 are also supplied into the electronic control unit C. The vigilance degree detector 37 which may be used, is those for analyzing frequency components for driver's driving operations (e.g., an operation of an accelerator and a steering operation), for analyzing the conditions of motion of the vehicle (e.g., whether or not each of the longitudinal acceleration and lateral acceleration exceeds a preset value, or the like), for monitoring the movements of driver's eyeballs and eyelids, and for metering physiological phenomenons such as the driver's brain wave, pulsation and skin resistance. When the vigilance degree is reduced to a level less than a predetermined value, a high level signal is delivered from the vigilance degree detector 37.

The electronic control unit C controls the operation of the electric-powered hydraulic pressure producing means Al on the basis of the signals from the distance measuring unit 32, the wheel speed sensors $35_{FL}$, $35_{FR}$, $35_{RL}$ and $35_{RR}$, the yaw rate sensor 36 and the vigilance degree detector 37, and controls an alarm $A_2$ as an actuator.

Figure 3:
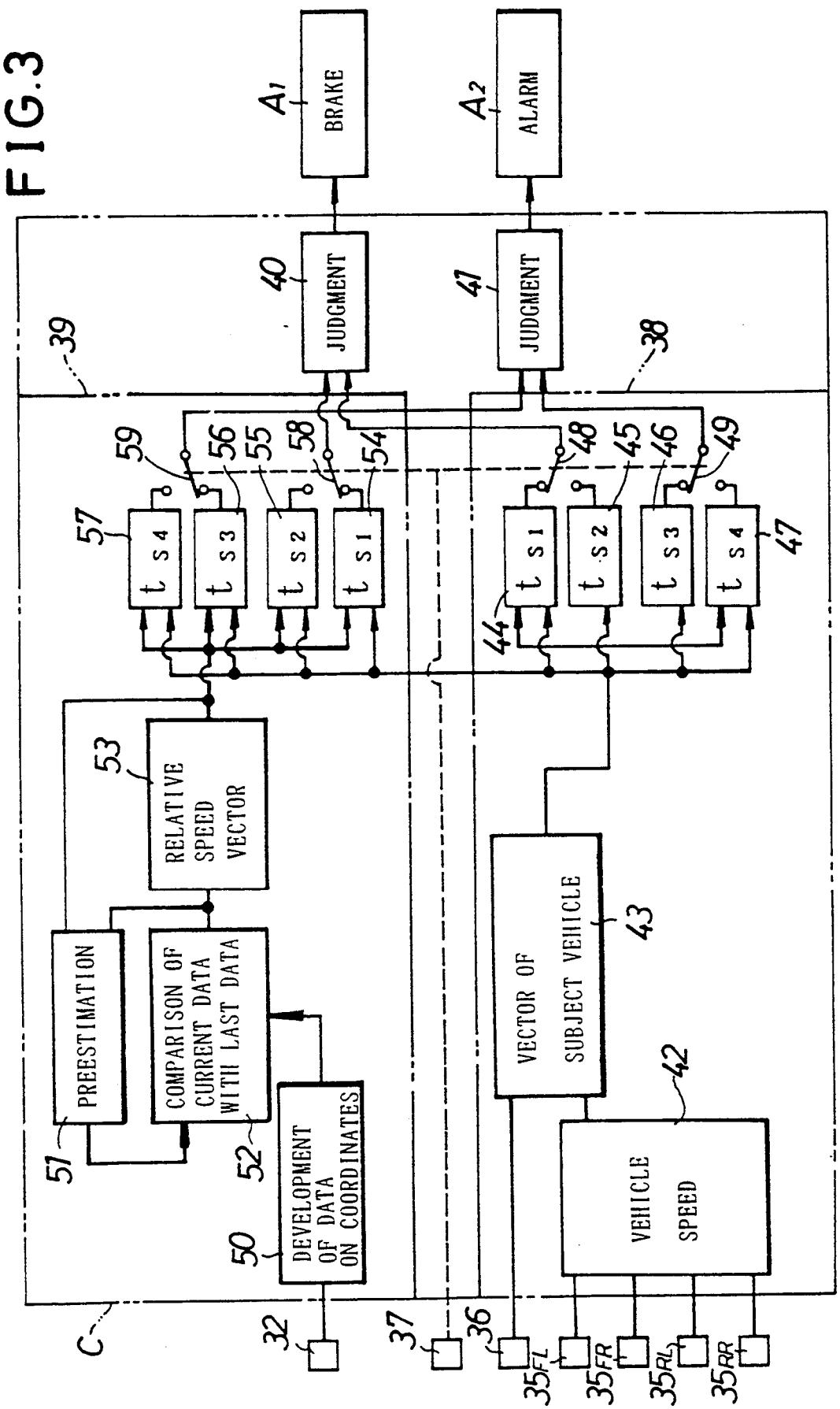

Referring to FIG. 3, the electronic control unit C comprises a subject vehicle position estimating means 38, an obstacle position estimating means 39, and first and second judging means 40 and 41.

The subject vehicle position estimating means 38 comprises a vehicle speed calculating section 42 for calculating a vehicle speed on the basis of detection values detected by the wheel speed sensors $35_{FL}$, $35_{FR}$, $35_{RL}$ and $35_{RR}$; a subject vehicle vector calculating section 43 for determining a vector of the subject vehicle on the basis of a yaw rate detected by the yaw rate sensor 36 and by a vehicle speed obtained in the vehicle speed calculating section 42; first, second, third and fourth subject vehicle positions calculating section 44, 45, 46 and 47; a switchover section 48 for selecting either one of outputs from the first and second subject vehicle position calculating sections 44 and 45, in accordance with an output signal from the vigilance degree detector 37, to supply such selected output to the first judging means 40; and a switchover section 49 for selecting either one of outputs from the third and fourth subject vehicle position calculating sections 46 and 47, in accordance with the output signal from the vigilance degree detector 37, to supply such selected output to the second judging means 41.

In each of the first, second, third and fourth subject vehicle position calculating sections 44, 45, 46 and 47, the position of the subject vehicle is calculated after lapse of a preset time from a braking starting time supposing that the braking is started at a certain time. Thus the subject vehicle vector, based on the travel speed and direction of the subject vehicle, is multiplied by a preset time, thereby calculating the position of the subject vehicle after a lapse of the preset time from the braking starting time. More specifically, if the travel speed of the subject vehicle is represented by $V_1$ and the calculation time required from the detection to the delivery is by $t_o$, and if the preset time is represented by $t_s$, and the preset deceleration during braking is represented by $a_1$, a travel distance $L_1$ of the subject vehicle, in a travelling direction for a period of time from the braking starting time until the preset time is lapsed, is determined basically according to the following expressions (1) and (2) in the first to fourth subject vehicle position calculating sections 44 to 47:

$$\Delta t = t_s - t_o \quad (1)$$

$$L_1 = V_1 \cdot t_o + V_1 \cdot \Delta t - 0.5 \cdot a_1 \cdot \Delta t^2 \quad (2)$$

Here, a first preset time $t_{s1}$, e.g., 1.5 sec. shorter than the time enough to avoid the collision of the subject vehicle against an objective obstacle ahead of the vehicle by the steering or braking manipulation in a condition of the driver having a high vigilance degree, is set in the first subject vehicle position calculating section 44. A second preset time $t_{s2}$, e.g., 1.8 sec longer than the first preset time $t_{s1}$ is set in the second subject vehicle position calculating section 45. A third preset time $t_{s3}$, e.g 2.5 sec longer than the second preset time $t_{s1}$ is set in the third subject vehicle position calculating section 46. A fourth preset time $t_{s4}$, e.g., 2.8 sec longer than the third preset time $t_{s3}$ is set in the fourth subject vehicle position calculating section 47. Thus, in each of the subject vehicle position calculating sections 44 to 47, the calculations, according to the above-described expressions, are carried out on the basis of each of the preset times $t_{s1}$ to $t_{s4}$, independently set therein, thereby estimating the position of the subject vehicle after a lapse of each of the preset times $t_{s1}$ to $t_{s4}$ from the braking starting time point.

The switchover section 48 is adapted to supply the output from the first subject vehicle position calculating sect 44 into the judging means 40, when the output from the vigilance degree detector 37 is of a high level, i.e., when the vigilance degree of the driver is sufficiently high, and to supply the output from the second subject vehicle position calculating sect 45 into the judging means 40, when the output from the vigilance degree detector 37 becomes a low level, i.e., when the vigilance degree of the driver is decreased. The switchover section 49 is adapted to supply the output from the third subject vehicle position calculating section 46 into the judging means 41, when the output from the vigilance degree detector 37 is of a low level, and to supply the output from the fourth subject vehicle position calculating section 47 into the judging means 41, when the output from the vigilance degree detector 37 becomes a high level.

The obstacle position estimating means 39 comprises a coordinates developing section 50 for developing positions of objective obstacles on X and Y coordinates based on the signal from the distance measuring unit 32; a preestimating and calculating section 51; a comparing and calculating section 52 for comparing data preestimated in the immediately preceding time in the preestimating and calculating section 51 with current data developed on the coordinates developing section 50 to take up the data identified as the same obstacle; a relative speed vector calculating section 53 for calculating a relative speed vector of objective obstacles on the basis of the data identified as the same obstacle; first, second, third and fourth obstacle position calculating sections 54, 55, 56 and 57; a switchover section 58 for selecting either one of outputs from the first and second obstacle position calculating section 54 and 55 in accordance with the output signal from the vigilance degree detector 37, for supplying such selected output into the first judging means 40; and a switchover section 59 for selecting either one of outputs from the third and fourth obstacle position calculating sections 56 and 56, in accordance with the output signal from the vigilance degree detector 37, for supplying such selected output into the second judging means 41.

Figure 4:
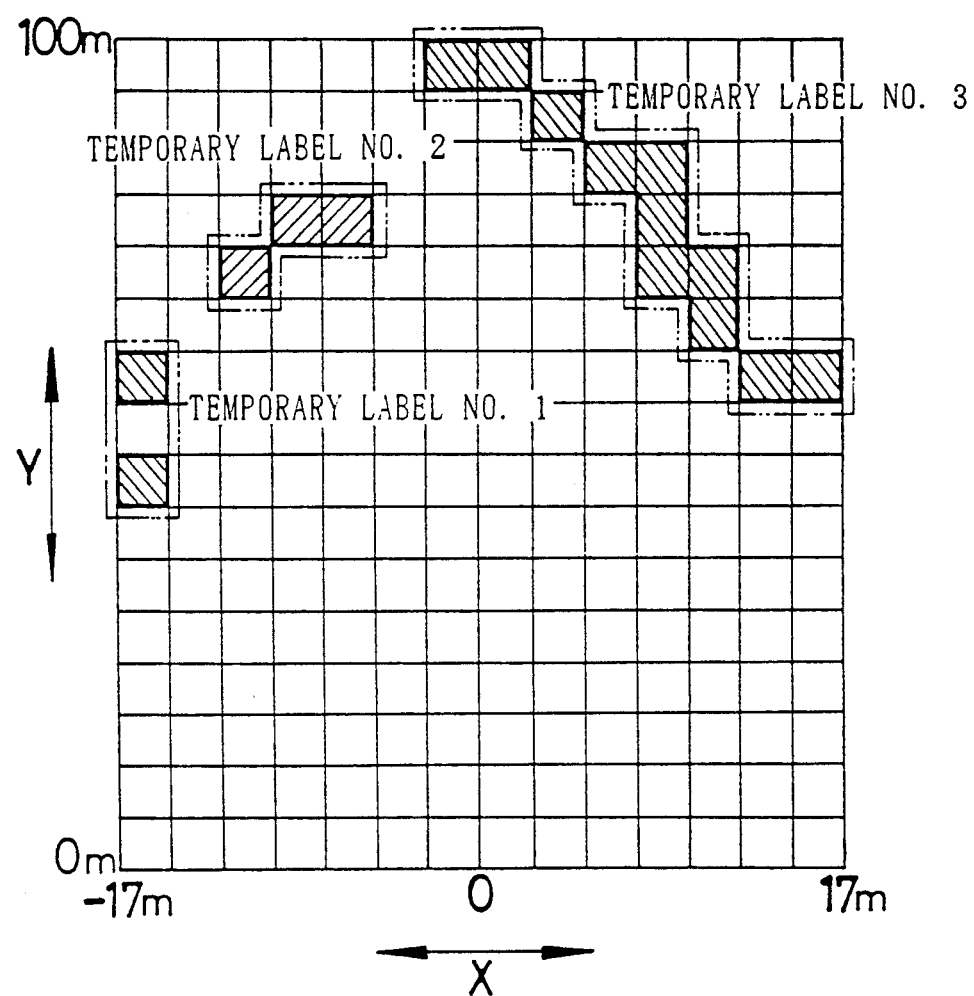

In the coordinates developing section 50, the data from the distance measuring unit 32 are developed on the X and Y coordinates in which the position of the subject vehicle is defined as an origin (X=0 and Y=0); the widthwise direction of the vehicle is represented by an X axis and the travel direction of the vehicle is represented by a Y axis, and temporary labels are sequentially affixed; for example, as Nos. 1, 2, 3---, to the obstacle data which are in proximity to one another on the coordinates, as shown in FIG. 4. For example, the temporary labels Nos. 1, 2 and 3 are affixed in FIG. 4, and the coordinates of the width (the length in a direction of the X axis), the longitudinal length (the length in a direction of the Y axis) as well as the position of the centroid for every temporary labels Nos. 1, 2 and 3 are found, as given in Table 1.

TABLE 1

| Temporary label No. | Detection Data | | | |
| --- | --- | --- | --- | --- |
| | Width (m) | Longitudinal length (m) | Position of centroid | |
| | | | X abscissa | Y ordinate |
| 1 | 2.4 | 18.8 | −15.8 | +53.1 |
| 2 | 7.3 | 12.5 | −8.5 | +76.9 |
| 3 | 19.4 | 43.8 | +8.5 | +78.1 |

The preestimating and calculating section 51 calculates the preestimated position for every formal label on the basis of the data formally labeled in the comparing-/calculating section 52 as well as the relative speed vector provided in the relative speed vector calculating section 53, for example pre-estimates the width (the length in the direction of X axis), the longitudinal length (the length in the direction of Y axis, as well as the position of centroid for every formal label, as given in Table 2.

TABLE 2

| Label No. | Last Preestimated Data | | | |
| --- | --- | --- | --- | --- |
| | Width (m) | Longitudinal length (m) | Position of centroid | |
| | | | X abscissa | Y ordinate |
| 4 | 7.3 | 15.6 | −9.0 | +76.0 |
| 8 | 2.4 | 21.2 | −15.8 | +54.0 |
| 15 | 17.0 | 50.0 | +9.7 | +70.6 |

In the comparing/calculating section 52, the current (now) data given in Table 1 is compared with the preestimated data given in Table 2, and only the current data, having the position of centroid substantially corresponding to the position of centroid of the preestimated data, is affixed with a formal label, as given in Table 3, and delivered from the comparing/calculating section 52.

TABLE 3

| Tem. No. | La. No. | Current Data | | | |
| --- | --- | --- | --- | --- | --- |
| | | Width (m) | Longitudinal length (m) | Position of centroid | |
| | | | | X abscissa | Y ordinate |
| 2 | ▶ 4 | 7.3 | 12.5 | −8.5 | +76.9 |
| 1 | ▶ 8 | 2.4 | 18.8 | −15.8 | +53.1 |
| 3 | ▶ 15 | 19.4 | 43.8 | +8.5 | +78.1 |

Tem. La. = Temporary Label
La. = Label

In the relative speed vector calculating section 53, the relative speed vector for every formal label is calculated on the basis of the current data delivered from the comparing/calculating section 52 and the last data delivered last time from the comparing/calculating section 52. Thus, when the last data from the comparing-/calculating section 52 is as given in Table 4, the position of centroid of the current, data given in Table 3, is compared with the position of centroid of the last data given in Table 4, thereby calculating a difference between the positions of centroids in the directions of X and Y axes for every formal label, as given in Table 5.

TABLE 4

| Label No. | Last Data | | | |
| --- | --- | --- | --- | --- |
| | Width (m) | Longitudinal length (m) | Position of centroid | |
| | | | X abscissa | Y ordinate |
| 4 | 7.0 | 12.0 | −9.7 | +74.9 |
| 8 | 2.4 | 18.6 | −16.8 | +52.7 |
| 15 | 18.6 | 40.4 | +8.5 | +82.2 |

TABLE 5

| Label No. | Relative Difference | |
| --- | --- | --- |
| | Relative Value | |
| | X | Y |
| 4 | +1.2 | +2.0 |
| 8 | +1.0 | +0.4 |
| 15 | 0.0 | −4.1 |

The relative speed of each objective obstacle, relative to the subject vehicle, is obtained by dividing the difference for every formal label given in Table 5 by a sampling time, and the moving direction is provided from the relative difference between the directions of X and Y axes, given in Table 5.

In each of the first, second, third and fourth obstacle position calculating sections 54, 55, 56 and 57, supposing that the braking is started at a certain time, the position of the objective obstacle, after a lapse of the preset time from the braking starting time, is calculated by multiplying, by a preset time, the relative speed vector of the objective obstacle. The relative speed vector is obtained by adding the vector of the subject vehicle, provided in the subject vehicle vector calculating section 43 of the subject vehicle position calculating means 38, to the relative speed vector provided in the relative speed vector calculating section 53. More specifically, if the absolute speed of the objective obstacle, resulting from the addition of the relative speed to the speed of the subject vehicle, is represented by $V_2$ and the preset time is by $t_s$, and if the preset deceleration of the objective obstacle is by $\alpha_2$, the movement distance $L_2$, in the direction of movement of the objective obstacle after a lapse of the preset time, is determined basically according to the following expression (3) in each of the first, second, third and fourth obstacle position calculating sections 54, 55, 56 and 57:

$$L_2 = V_2 \cdot t_s - 0.5 \cdot \alpha_2 \cdot \Delta t_s^2 \tag{3}$$

Figure 5:
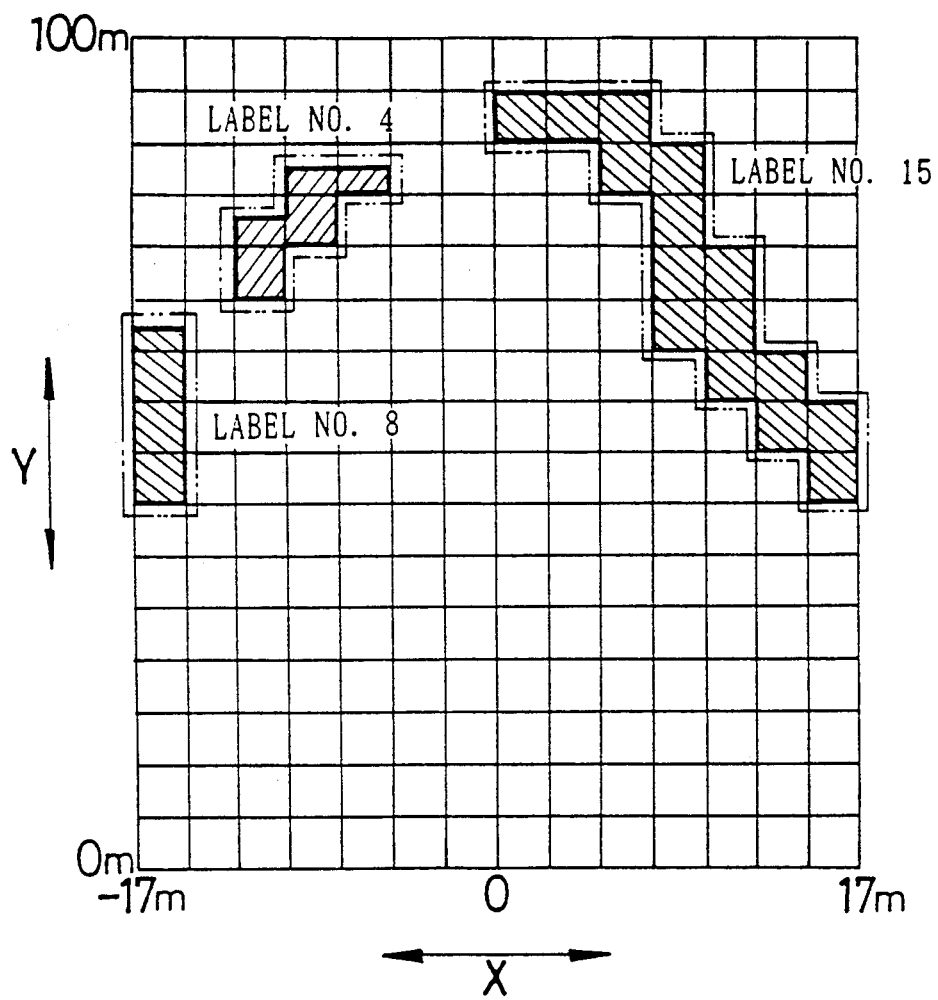

Here, a first preset time $t_{s1}$ is set in the first obstacle position calculating section 54; a second preset time $t_{s2}$ is set in the second obstacle position calculating section 55; a third preset time $t_{s3}$ is set in the third obstacle position calculating section 56, and a fourth preset time $t_{s4}$ is set in the fourth obstacle position calculating section 57. In each of the first, second, third and fourth obstacle position calculating sections 54, 55, 56 and 57, the calculation, according the above expression (3), is carried out by use of each of the preset times $t_{s1}$ to $t_{s4}$, independently set therein. This allows the position of the objective obstacle, after the lapse of each of the preset times $t_{s1}$, $t_{s2}$, $t_{s3}$ and $t_{s4}$, to be estimated, thereby enabling the estimated position of the objective obstacle, after the lapse of each of the preset times $t_{s1}$, $t_{s2}$, $t_{s3}$ and $t_{s4}$, to be developed on the X and Y coordinates, as shown in FIG. 5.

The switchover section 58 is set to supply the output from the first obstacle position calculating section 54 into the judging means 40 when the output from the vigilance degree detector 37 is of the low level, and to supply the output from the second obstacle position calculating section 55 into the judging means 40, when the output from the vigilance degree detector 37 is of the high level. The switchover section 59 is set to supply the output from the third obstacle position calculating section 56 into the judging means 41, when the output from the vigilance degree detector 37 is of the low level, and to supply the output from the fourth obstacle position calculating section 57 into the judging means 41, when the output from the vigilance degree detector 37 is at the high level.

The judging means 40 compares the position of the subject vehicle, delivered from the first or second subject vehicle position calculating section 44 and 45 of the subject vehicle position estimating means 38 with the position of the objective obstacle, delivered from the first or second obstacle position calculating section 54 or 55 of the obstacle position estimating means 39, and produces an operating signal, indicative of a command to operate the electric-powered hydraulic pressure producing means $A_1$, when these positions coincide with each other. More specifically, when the estimated position of the objective obstacle is superposed on the estimated position of the subject vehicle shown in FIG. 5, the electric-powered hydraulic pressure producing means $A_1$ is operated. The judging means 41 compares the position of the subject vehicle, delivered from the third or fourth subject vehicle position calculating section 46 or 47, of the subject vehicle position estimating means 38, with the position of the objective obstacle delivered from the third or fourth obstacle position calculating section 56 or 57 of the obstacle position estimating means 39, and produces an operating signal, indicative of a command to operate the alarm $A_2$, if these positions coincide with each other.

The operation of this embodiment will be described below. Supposing that the braking is started at a certain time, the position of the subject vehicle after the lapse of the preset time, from such braking start time, is estimated by the subject vehicle position estimating means 38. The position of the objective obstacle, after the lapse of the preset time from such braking start time point, is estimated by the obstacle position estimating means 39. The alarm $A_2$ can be operated for alarming, or both of the alarm $A_2$ and the electric-powered hydraulic pressure producing means $A_1$ can be operated by the comparison of both the estimated positions, thereby avoiding the collision of the vehicle against the objective obstacle, or providing a reduction in damage upon the collision.

More in a condition of the driver having a high vigilance degree, the first preset time $t_{s1}$ is set shorter than the than the time enough to avoid the collision of the vehicle against the objective obstacle by the driver's steering operating, and the third preset time $t_{s3}$ is set longer than the first preset time $t_1$. When the positions of the subject vehicle and the objective obstacle, estimated by the calculations based on the third preset time $t_{s3}$ coincide with each other, the alarm $A_2$ can be operated to previously notify the driver of the fact that there is a possibility of collision. When the positions of the subject vehicle and the objective obstacle estimated by the calculations based on the first preset time $t_{s1}$ coincide with each other, the alarm $A_2$ can be operated and at the same time, the electric-powered hydraulic pressure producing means $A_1$ can be automatically operated, thereby avoiding the collision of the vehicle against the objective obstacle, or providing a reduction in damage upon the collision.

Therefore, when the collision can be avoided by the driver's steering operation, the electric-powered hydraulic pressure producing means $A_1$ cannot be operated, leading to a reduced frequency of operation of the electric-powered hydraulic pressure producing means $A_1$ and to an improved feeling of driving.

In estimating the position of the objective obstacle, in the obstacle position estimating means 39, the absolute vector of the objective obstacle is provided. This enables a judgment of whether the objective obstacle is a moving obstacle or a stationary obstacle. Such a judgment enables an application to a more precise control.

Moreover, as can be seen in the expressions (1) and (3), the preset deceleration $\alpha_1$ is used in estimating the position of the subject vehicle, and the preset deceleration $\alpha_2$ is used in estimating the position of the objective obstacle. By estimating the positions by use of such decelerations $\alpha_1$ and $\alpha_2$, a high accuracy estimation can be achieved, and thus, a high accuracy judgment of collision can be achieved.

In the condition of the driver having a low vigilance degree, the fourth preset time $t_{s4}$ is set longer than the third preset time $t_{s3}$, and when the positions of the subject vehicle and the objective obstacle, estimated by the calculations based on the fourth preset time $t_{s4}$, coincide with each other, the alarm $A_2$ is operated. When the positions of the subject vehicle and the objective obstacle, estimated by the calculations based on the second preset time $t_{s2}$ longer than the first preset time $t_{s1}$, coincide with each other, the alarm $A_2$ is operated and, at the same time, the electric-powered hydraulic pressure producing means $A_1$ is automatically operated. That is, in the condition of the driver having a low vigilance degree, the control of the operations of the electric-powered hydraulic pressure producing means $A_1$ and the alarm $A_2$, in consideration with the vigilance degree of the driver, can be achieved by insuring a longer time required for avoiding the collision by the operations of the electric-powered hydraulic pressure producing means $A_1$ and the alarm $A_2$ for the avoidance of the collision.

Further, in the obstacle position estimating means 39, the development of the determined data on the X and Y coordinates, as well as the labeling on the coordinates, is carried out and therefore, the number and distribution of objective obstacles can be correctly grasped, and the calculation of the relative speed for every label leads to an improved accuracy of estimation of the positions of the plurality of obstacles. Moreover, the amount of movement for every label is derived from a difference between the positions of the respective centroids of the data for each of the labels and, therefore, the calculation o the amount of movement of the objective obstacle is made simplified and correct. By calculating the relative speed vector for only the substantially corresponding data by comparing the positions of centroids of the last preestimated data and the current data, it is possible to ensure that a sudden variation in determined data, due to a noise, or the like, is insensitive, thereby avoiding a misjudgment.

Figure 6:
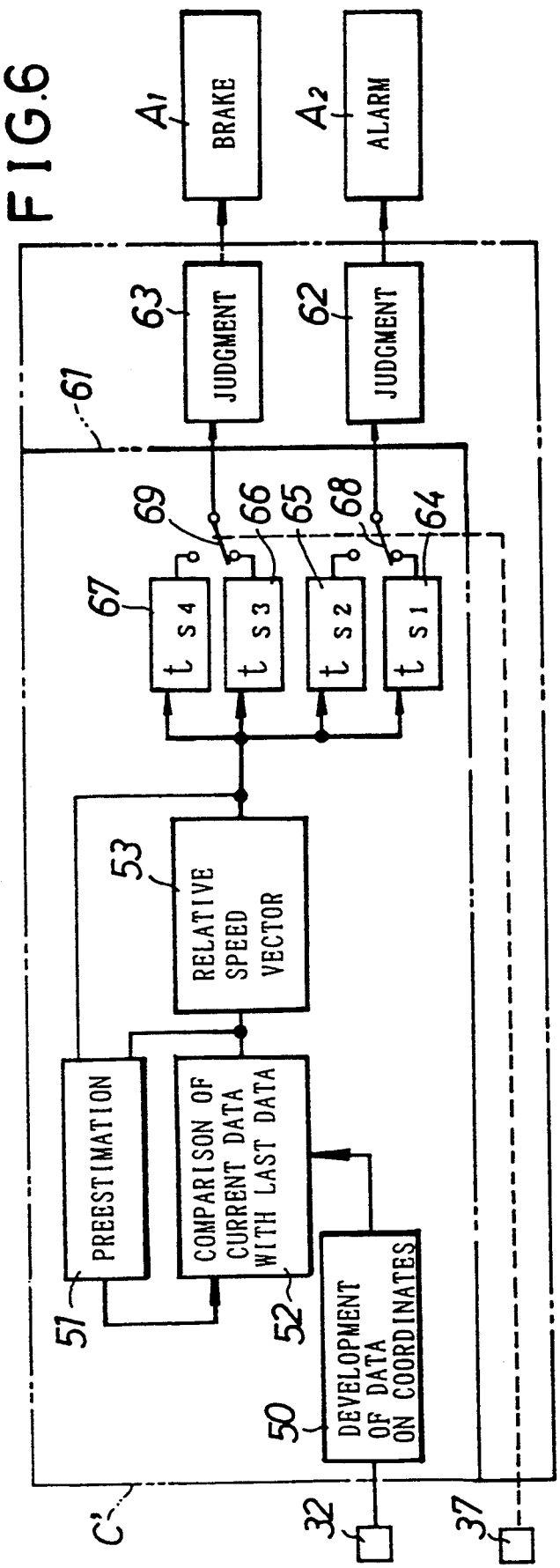
FIG. 6 is a block diagram similar to FIG. 3 but illustrating second embodiment, which is a modification to the first embodiment.

FIG. 6 illustrates a second embodiment of the present invention, in which parts or components corresponding to those in the previously-described first embodiment are designated by the like reference characters.

An electronic control unit C' comprises a relative position estimating means 61, and first and second judging means 62 and 63. The electronic control unit C' controls the operation of the electric-powered hydraulic pressure producing means $A_1$ on the basis of signals from the distance measuring unit 32 and the vigilance degree detector 37, and also controls the operation of the alarm $A_2$.

The relative position estimating means 61 comprises a coordinates developing section 50 for developing positions of objective obstacles on the X and Y coordinates by a signal from the distance measuring unit 32; a preestimating and calculating section 51; a comparing and calculating section 52 for comparing data received last in the preestimating and calculating section 51 with current or present data developed in the coordinates developing section 50 to take up the data judged as the same obstacle; a relative speed vector calculating section 53 for calculating the relative speed vector of the objective obstacles on the basis of the data judged as the same obstacle; first, second, third and fourth obstacle relative-position calculating sections 64, 65, 66 and 67; a switchover section 68, for selecting either one of outputs from the first and second obstacle relative-positions calculating sections and 65, in accordance with the output signal from the vigilance degree detector 37, for supplying such selected outputs into the first judging means 62; and a switchover section 69 for selecting either one of outputs from the third and fourth obstacle relative-position calculating sections 66 and 67, in accordance with the output signal form the vigilance degree detector 37, for supplying such selected outputs into the second judging means 63.

In each of the first, second, third and fourth obstacle relative-position calculating sections 65, 65, 66 and 67, supposing that the braking is started at a certain time, the relative position of the objective obstacle, after a lapse of a preset time from such braking start time, is calculated by multiplying the relative speed vector provided in the relative speed vector calculating section 53 by the preset time. More specifically, if the relative speed is represented by $\Delta V$ and the time of calculation required from the detection to the delivery is by $t_o$, and if the preset time is represented by $t_s$ and the preset deceleration of the subject vehicle by $\alpha_1$ and the preset deceleration of the objective obstacle is by $\alpha_2$, a relative distance $L_3$ between the subject vehicle and the objective obstacle, after the lapse of the preset time, is determined basically according to the following expression (4) in each of the first, second, third and fourth obstacle relatives position calculating sections 64, 65, 66 and 67.

$$L_3 = \Delta V \cdot t_s - 0.5 \cdot \{\alpha_1 \cdot (t_s - t_o)^2 - \Delta_2 \cdot t_s^2\} \quad (4)$$

Here, a first preset time $t_{s1}$ is set in the first obstacle relative-position calculating section 64, and a second preset time $t_{s2}$ is set in the second obstacle relative-position calculating section 65. A third preset time $t_{s3}$ is set in the third obstacle relative-position calculating section 66, and a fourth preset time $t_{s4}$ is set in the fourth obstacle relative-position calculating section 67. In each of the first, second, third and fourth obstacle relative-position calculating section 64, 65, 66 and 67, the calculation according to the above expression by use of each of the preset times $t_{s1}$, $t_{s2}$, $t_{s3}$ and $t_{s4}$ independently set therein. This causes the relative position of the obstacle, after the lapse of each of the preset times $t_{s1}$, $t_{s2}$, $t_{s3}$ and $t_{s4}$, to be estimated.

The switchover section 68 is set to supply an output from the first obstacle relative-position calculating sect 64 into the judging means 62, when the output from the vigilance degree detector 37 is of a low level, and to supply an output from the second obstacle relative-position calculating section 65 into the judging means 62, when the output from the vigilance degree detector 37, is of a high level. The switchover section 69 is set to supply an output from the third obstacle relative-position calculating section 66 into the judging means 63, when the output from the vigilance degree detector 37 is of the low level, and to supply an output from the fourth obstacle relative-position calculating section 67 into the judging means 63, when the output from the vigilance degree detector 37 is at high level.

The judging means 62 judges whether or not the relative position of the obstacle delivered from the first or second obstacle relative-position calculating section 64 or 65 is "0", and produces an operating signal, indicative of a command to operate the alarm $A_2$, when such relative position is "0". The judging means 63 judges whether or not the relative position of the obstacle delivered from the third or fourth obstacle relative-position calculating section 66 or 67 is "0", and produces an operating signal, indicative of a command to operate the electric-powered hydraulic pressure producing means $A_1$, when such relative position is "0".

With this second embodiment, the construction of the electronic control unit C' can be simplified, as compared with that in the first embodiment.

Although the first and second embodiments of the present invention have been described in detail, it will be understood that the present invention is not intended to be limited to these embodiments, and various minor modifications in design can be made without departing from the spirit and scope of the invention defined in the claims.

For example, in place of each of the decelerations $\alpha_1$ and $\alpha_2$ used in the expressions (2), (3) and (4) as a preset deceleration, and an actual deceleration of the subject vehicle and an actual deceleration of the obstacle can be used.

A third embodiment of the present invention will now be described in connection with FIGS. 7 to 15 while appropriately comparing with the prior art.

Figure 7:
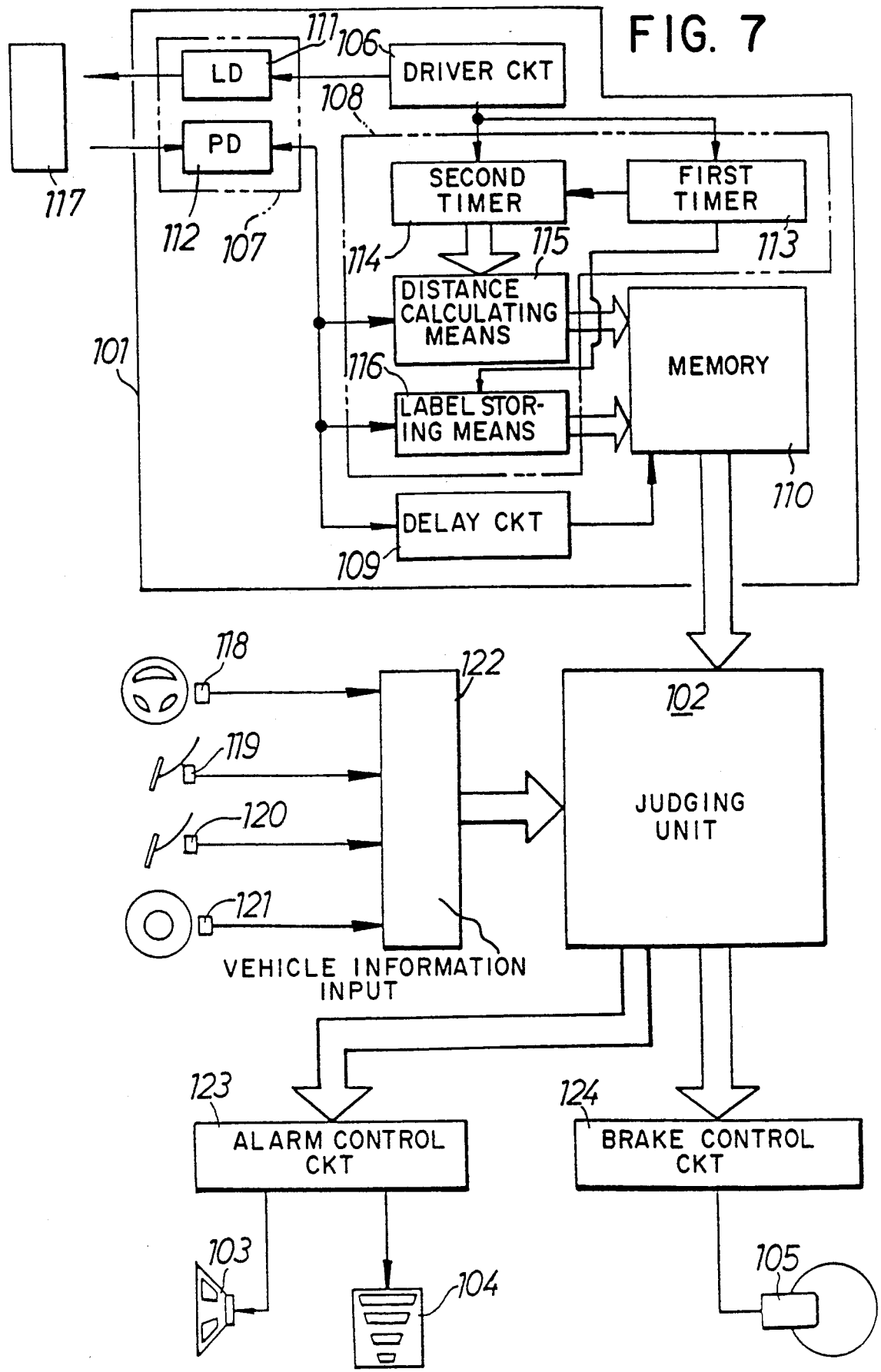

Referring first to FIG. 7, the distance between the automobile vehicle and an objective matter 117 lying ahead of such automobile vehicle is measured by a distance measuring unit 101 mounted in the automobile vehicle. In a judging unit 102 comprising a computer, the relative speed between the automobile vehicle and the objective matter 117 is calculated on the basis of the distance provided by the distance measuring unit 101, and the judgement of collision based on the relative speed is performed. According to the result of such judgement, the operations of an alarm sound generator 103, an alarm indicator 104 and a brake 105 are controlled.

Figure 8:
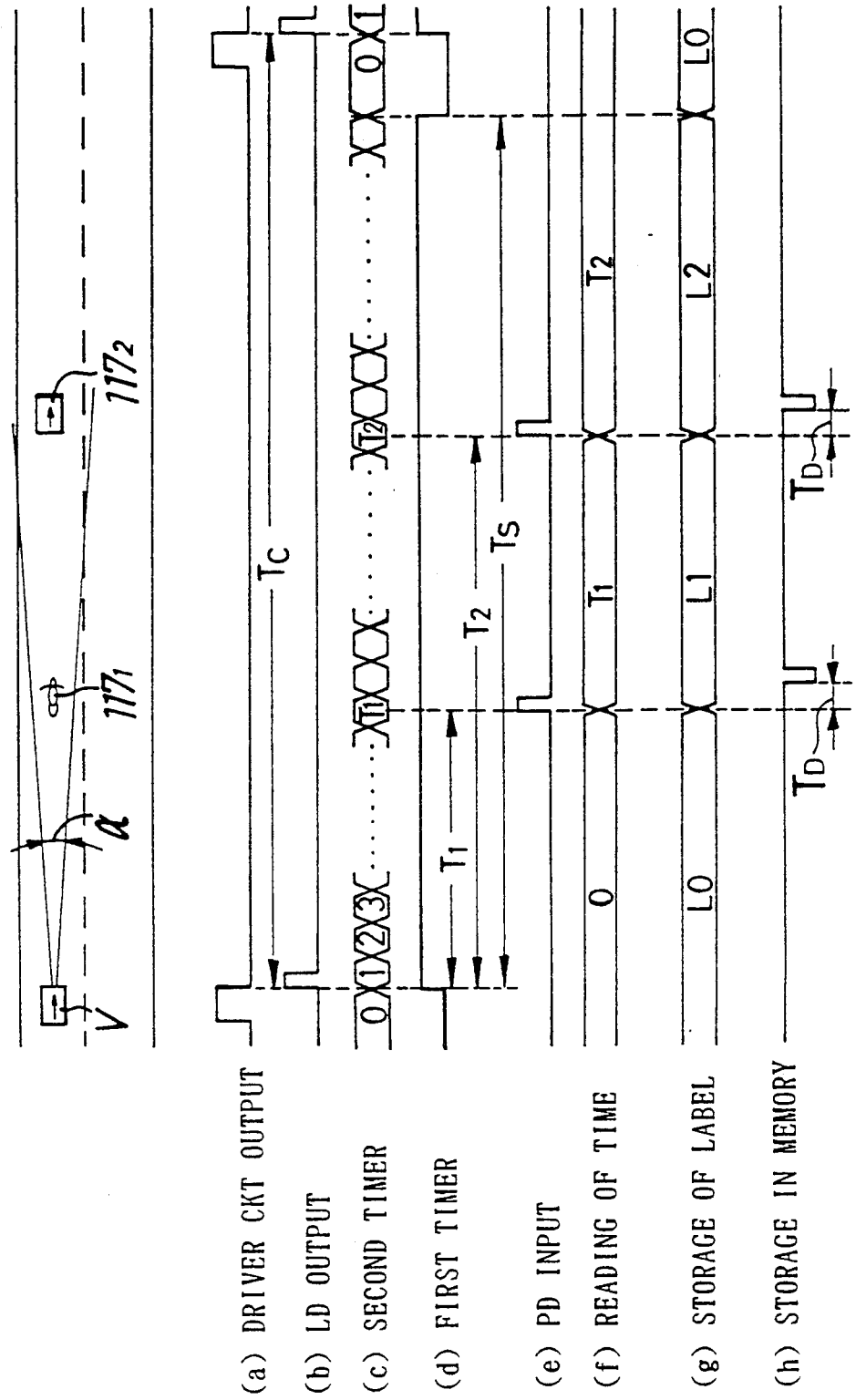

The distance measuring unit 101 comprises a driver circuit 106 for producing a high level driving signal of a given time for every given cycle $T_c$ (see FIG. 8). A transmitting and receiving section 107 transmits a given pulse signal, in response to falling of the driving signal output from the driver circuit 106, toward the objective matter 117, and receives a reflected signal from the objective matter 117. A calculating section 108 calculates the distance from the subject vehicle to the objective matter 117 on the basis of the time between the transmission and the reception. As the transmitting and receiving section 107 receives the reflected signal, a delay circuit 109 produces a trigger signal later than such reception of the reflected signal by a predetermined time $T_D$. A memory 110 takes-in and stores the result of calculation in the calculating section 108 in response to reception of the trigger signal from the delay circuit 109.

The transmitting and receiving section 107 is comprised of a laser diode 111 for transmitting a single pulse signal, having a predetermined extent angle c (see FIG. 8), toward the objective matter 117 in response to the falling of the driving signal output from the driver circuit 106, and a photo-diode 112 for producing a high level reception signal in response to the reception of the reflected signal from the objective matter 117.

The calculating section 108 includes a first timer 113 for starting the counting of a sampling time $T_s$ set shorter than a cycle $T_c$ (see FIG. 8) of transmitting the pulse signal in response to falling of a driving signal output from the driver circuit 106 and producing a resetting signal as the counting of the sampling time $T_s$ is completed. A second timer 114 starts the counting, in response to the transmission of the pulse signal from the transmitting/receiving section 107, i.e., falling of the driving signal from the driver circuit 106, and is reset by the reception of the resetting signal from the first timer 113. A distance calculating means 115 reads the counted time of the second timer 114, whenever the reflected signal is received into the transmitting/receiving section 107 during counting of the second timer 114, and the means 115 calculates the distance from the subject vehicle to the objective matter 117 on the basis of the read time and the transmitting speed of the pulse signal. A label storing means 116 applies a different label whenever the reflected signal is receiving into the transmitting/receiving section 107 during counting of the second timer 114, and the means 116 is reset by the resetting signal from the first timer 113.

The memory 110 stores, in a corresponding relation, the distance calculated in the distance calculating means 115 and the label stored in the label storing means 116, whenever the trigger signal from the delay circuit 109 is received therein to. The contents, stored in the memory 110, are applied to the judging unit 102.

The operation timing for each of the components in the distance measuring unit 101 are, for example, as shown in FIG. 8.

Herein, suppose that a first objective matter $117_1$ (e.g., a motorcycle) is travelling ahead of a vehicle V equipped with the distance measuring unit 101, and a second objective matter $117_2$ (e.g, a four-wheel vehicle) is travelling further ahead of the first objective matter $117_1$, these objective matters $117_1$ and $117_2$ being within the extent angle of the pulse signal from the transmitting/receiving section 107. In response to delivery of the driving signal, with the given cycle $T_c$ from the driver circuit 106, as shown in FIG. 8(a), the pulse signal is delivered for every given cycle $T_c$ from the laser diode 111 of the transmitting/receiving section 107, as shown in FIG. 8(b). In addition, the counting operation of the first timer 113 is started, and the counting operation of the second timer 114 is started, as shown in FIG. 8(c). When a reflected signal from the first objective matter $117_1$ is then received into the photo-diode 112 of the transmitting/receiving section 107, as shown in FIG. 8(e), the now time $T_1$ counted in the second timer 114 is read in the distance calculating means 115, as shown in FIG. 8(f), and in the label storing means 116, a label for the first objective matter $117_1$ is applied as "L1", and such label "L1" is stored therein, as shown in FIG. 8(g).

When a reflected signal from the second objective matter $117_2$ is received in the photo-diode 112, as shown in FIG. 8(e), the now time $T_2$, counted in the second timer 114, is read in the distance calculating means 115, as shown in FIG. 8(f), and in the label storing means 116, a label for the second objective matter $117_2$ is applied as "L2", and such label "L2" is stored therein, as shown in FIG. 8(g).

Moreover, when a delay in time $T_D$ is lapsed from the reception of the reflected signal from the first objective matter $117_1$ as well as from the reception of the reflected signal from the second objective matter $117_2$, respectively, the distance calculated on the basis of the counted time $T_1$ and the label L1, as well as the distance calculated on the basis of the counted time $T_2$ and the label L2, are stored in a corresponding relation in the memory 110 in response to the delivery of the trigger signal from the delay circuit 109, as shown in FIG. 8(h). In the distance measuring unit 101, the distances between the vehicle V and the first and second objective matters $117_1$ and $117_2$ are calculated on the basis of the counted times $T_1$ and $T_2$, and these calculated distances are stored with the labels "L1" and "L2" applied thereto.

When the given sampling time $T_s$ is lapsed from the transmission of the pulse signal from the laser diode 111, the resetting signal is delivered from the first timer 113, as shown in FIG. 8(d). In response to the reception of such resetting signal, the second timer 114 and the label storing means 116 are reset, as shown in FIGS. 8(c) and 8(g), respectively. Such a series of measuring operations are repeated at every given cycle $T_c$.

Referring again to FIG. 7, detection values, detected in a steering angle detector 118, a brake operation detector 119, an accelerator operation amount detector 120 and a vehicle speed detector 121 are supplied to the judging unit 102, through a vehicle information receiving unit 122. The operations of the alarm sound generator 103 and the alarm indicator 104 are controlled by an alarm control circuit 123, and the operation of the brake 105 is controlled by a brake control circuit 124. The judging unit 102 performs the judgment of collision of the subject vehicle against the objective matter 117, according to a procedure shown in FIGS. 9, 10 and 11, on the basis of the objective matter data, obtained in the distance measuring unit 101, as well as vehicle information received thereunto from the vehicle information receiving unit 122, and applies a control signal, based on the result of such judgment, to the alarm control circuit 123 and the brake control circuit 124.

Figure 9:
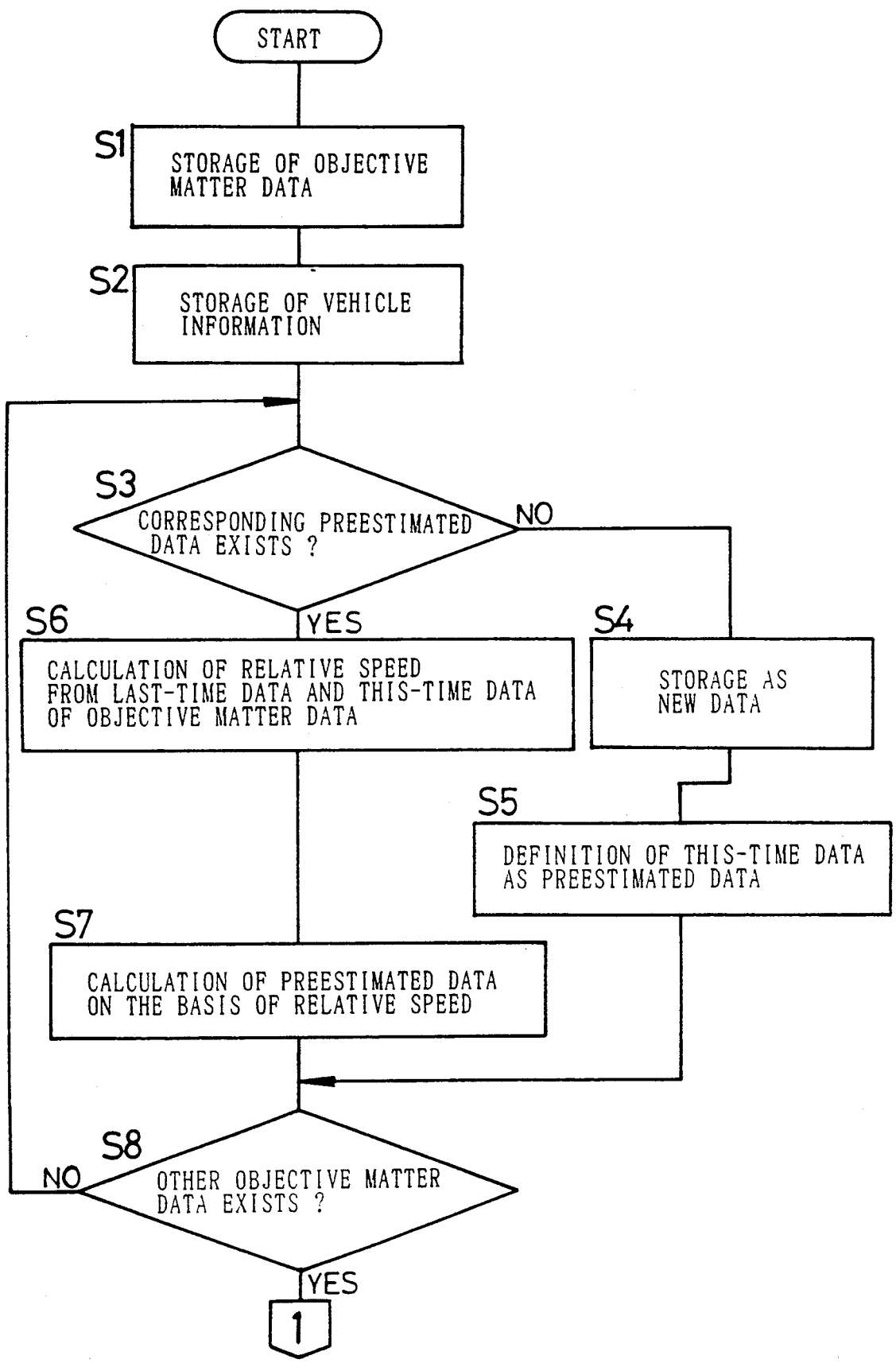

At a step S1 shown in FIG. 9, each of the objective matter data is taken in from the memory 110 of the distance measuring unit 101. At a second step S2, vehicle information, such as a steering angle, whether or not the braking has been conducted, the amount of operation of an accelerator and a vehicle speed is taken in from the vehicle information receiving unit 122.

At a third step S3, it is judged whether or not the objective matter data, preestimated in the last-time judgment, and the objective matter data, obtained this time, coincide with each other within a predetermined range. When there are no corresponding preestimated data, the objective matter data, having no corresponding preestimated data, are stored as new data at a fourth step S4. Then, at the next step S5, the stored data are set, as next-time preestimated data, progressing to an eighth step S8.

When it is decided at the third step S3 that there are corresponding preestimated data, a relative speed between the objective matter and the subject vehicle is calculated from the last value and the now value of such objective matter data, at a sixth step S6. More specifically, at the sixth step S6, the amount of variation in distance resulting from the comparison of the last value with the now value of such objective matter data, at a sixth step S6.

At a next seventh step S7, the next-time preestimated data is calculated on the basis of the relative speed obtained at the sixth step S6, progressing to the eighth step S8. At this eighth step S8, it is judged whether or not the processing at the steps S3 and S7 for all the objective matter data received at the fist step S1 have been completed. When there is objective matter data remaining unprocessed, the processing is returned to the third step S3.

With respect to the objective matter data, labeled and calculated for single reflected signal or each of a plurality of reflected signals received into the photo-diode 112 of the transmitting/receiving section 107 within the sampling time $T_s$ by such processing at the third to eighth steps S3 to S8, it is judged whether or not there are the same data, by comparison of the preestimated data based on the past objective matter data with an objective matter data newly obtained. The relative speed can be obtained from every label from the amount of variation in distance for the objective matter identified as being the same.

Figure 10:
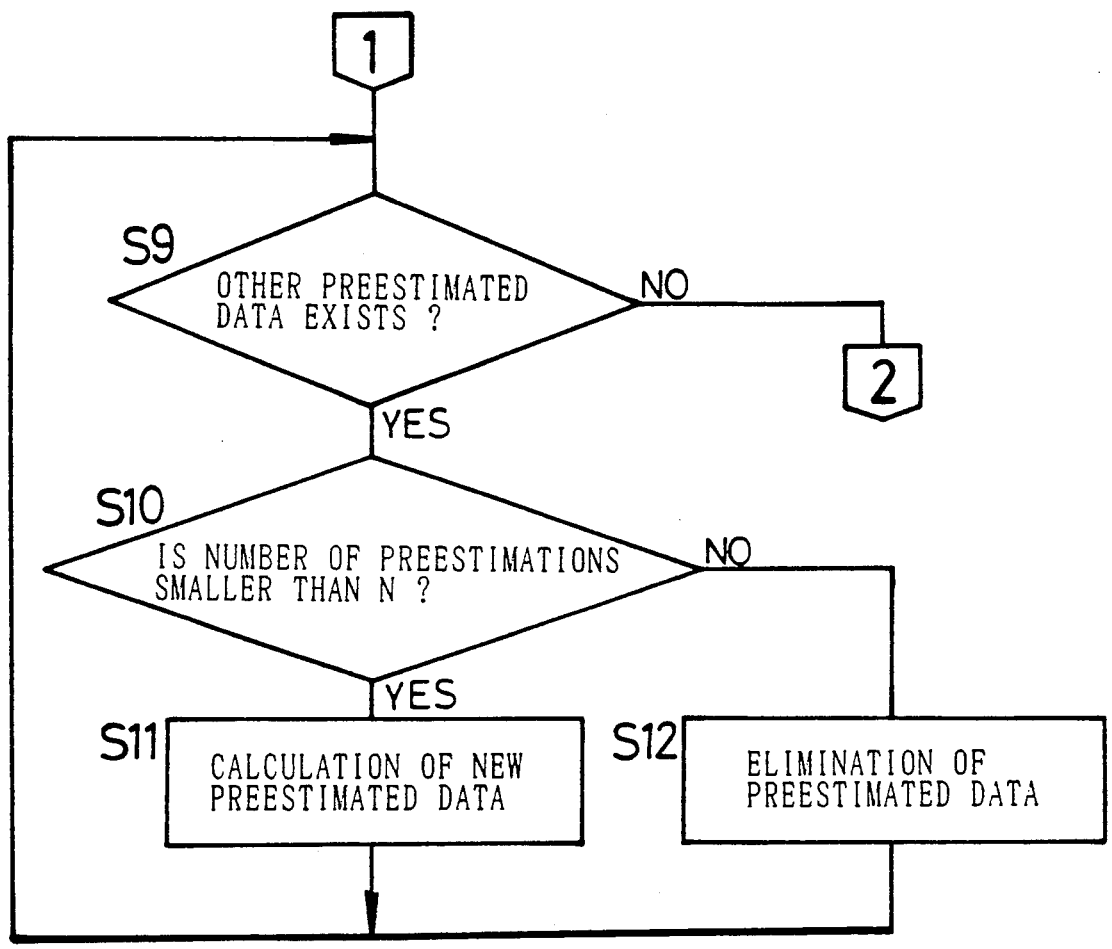

Subsequently to the eighth step S8, the processing is advanced to a ninth step S9, shown in FIG. 10, at which it is judged whether or not there are other preestimated data. More specifically, it is judged whether or not there are preestimated data other than the preestimated data used for comparison with the objective matter data obtained this time at the third step S3. If YES, the processing is advanced to a tenth step S10. At the tenth step S10, it is judged whether or not the number of preestimations performed with no corresponding objective matter data left as they are, is N, e.g., less than 3. If the number is less than 3, the processing is advanced to an eleventh step S11, at which a preestimated data, after the next given cycle $T_c$, is calculated on the basis of the past objective matter data or the preestimated data. More specifically, at the eleventh step S11, on the basis of the amount of variation of the past (e.g., last time and this time) objective matter data, the preestimated data, after the next-time given cycle $T_c$, is calculated by addition of such amount of variation to the this-time preestimated data. On the other hand, if the number of preestimations is equal to or more than N, such preestimated data is eliminated at a 12th step S12.

Figure 11:
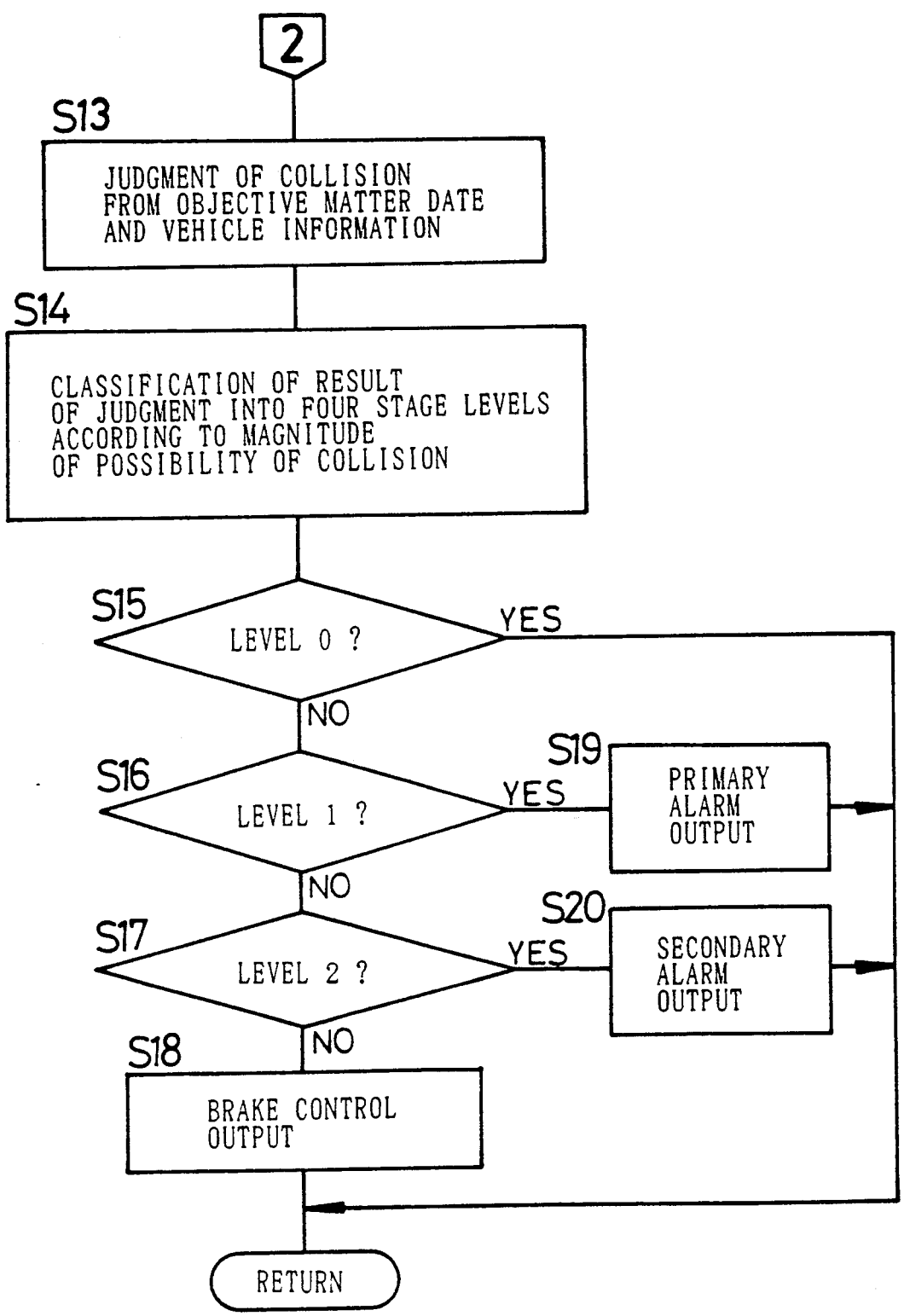

By the processing at the ninth to twelveth steps S9 to S12 in such a manner, a new preestimated data is calculated or eliminated with respect to all the preestimated data not corresponding to the objective matter data, and all the remaining preestimated data are processed, progressing from the ninth step S9 to a 13th step S13 shown in FIG. 11.

At the 13th step S13, the judgment of collision is carried out on the basis of each of the objective matter data and the vehicle information. More specifically, the judgment for a possibility of collision of the subject vehicle against the objective matter is carried out on the basis of the distance and relative speed between the subject vehicle and each of the objective matters, as well as the steering angle of the subject vehicle, whether or not the braking has been conducted, the amount of operation of the accelerator and the vehicle speed.

At the next 14th step S14, the results of the judgment of collision possibility at the 13th step S13 are classified into four stage levels of from a level 0 (zero) to a level 3. More specifically, the case where there is a low possibility of collision is classified as the level 0 (zero). The case where there is a possibility of collision and hence, an attention should be called to a driver is classified as the level 1. The case where there is a high possibility of collision and hence, an operation for avoiding such possibility is required, is classified as the level 2. The case where there is an extremely high possibility of collision and hence, the braking should be conducted is classified as the level 3.

After such classification, it is judged at a 15th step and S15 whether or not the result of the judgment is at the level 0. If the result is not at the level 0, it is judged at the 16th step S16 whether or not such result is at the level 1. If the result is not at the level 1, it is judged at the 17th step S17 whether or not such result is at the level 2. If the result is not at the level 2, it is decided that such result is at the level 3, and the brake control signal is delivered at the 18th step S18. On the other hand, when such result is at the level 1, a primary alarm signal is delivered at a 19th step S19. When such result is at the level 2, a secondary alarm signal is delivered at the 20th step S20.

The brake control circuit 124 operates the brake 105 in response to the delivery of the brake control signal. The alarm control circuit 123 operates the alarm indicator 104 in response to the delivery of the primary alarm signal. The alarm operates the alarm sound generator 103 and the alarm indicator 104, simultaneously, in response to the delivery of the secondary alarm signal.

The operation of this embodiment will be described below. In calculating section 108 of the distance measuring unit 101, the first timer 113 starts the counting of the given sampling time $T_s$ in response to the transmission of the pulse signal from the transmitting/receiving section 107, and at the same time, the second timer 114 starts the counting. When the reflected signal is received into the transmitting/receiving section 107, during the counting by the second timer 114, the distance calculating means 115 reads the counted time provided by the second timer 114 at every such reception of the reflected signal and calculates the distance from the subject vehicle to the objective matter on the basis of the read counted time. The label storing means 116 applies a different label at every reception of the reflected signal and stores each of the labels in correspondence to the counted time read in the distance calculating means 115 Moreover, the second timer 114 and the label storing means 116 are reset in response to the resetting signal from the first timer 113 with a lapse of the sampling time $T_s$. Therefore, whenever the reflected signal is received into the transmitting/receiving section 107 within the given sampling time $T_s$, the distance from the subject vehicle to the objective matter is calculated on the basis of the time lapsed from transmission of the pulse signal, and stored with an individual label applied thereto. This ensures that the distances from the subject vehicle to a plurality of objective matters can be calculated in distinction from one another.

Moreover, the objective matter data, preestimated on the basis of the past objective matter data, is compared with the objective matter data newly provided, and it is judged for every labels whether or not they are the same objective matter data. The amount of variation in distance is determined from every label by comparison of the last-time data and the this-time data with each other with respect to the objective matter data identified as being the same, and such amount of variation in distance is divided by the transmission of cycle $T_c$ to provide a relative speed. Therefore, the following advantages are given, as compared with the prior art in which only a single object matter data can be obtained by the single transmission of the pulse signal.

First advantage

Figure 12A:
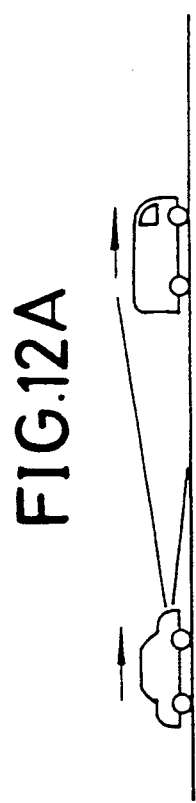
FIGS. 12A to 12C are diagrams illustrating characteristics obtained through the method of the present invention when noises are detected.
Figure 12D:
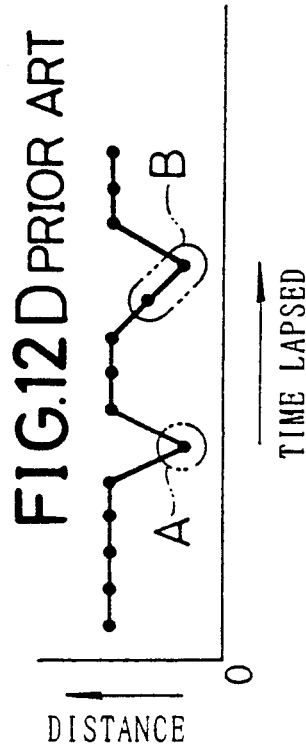
FIGS. 12D and 12E are diagrams similar to FIGS. 12A to 12C but of the prior art.
Figure 12E:
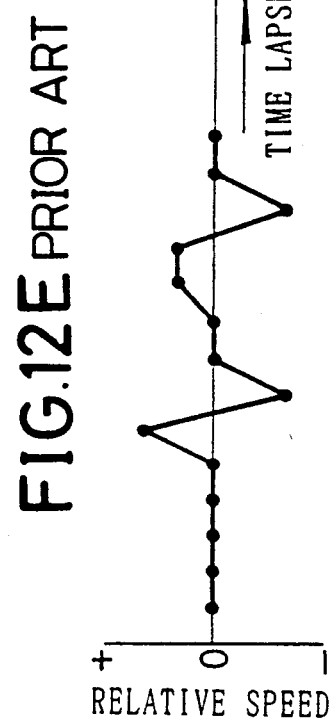
Figure 12B:
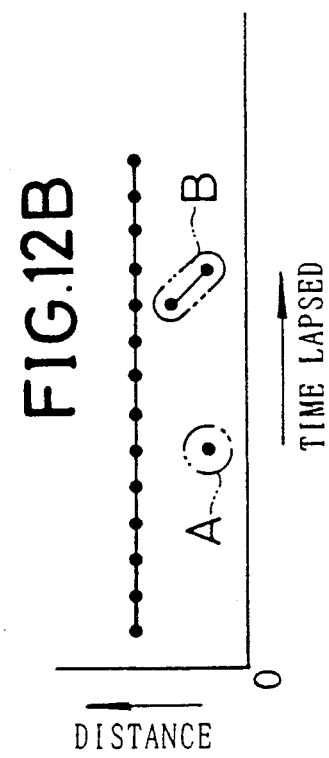
Figure 12C:
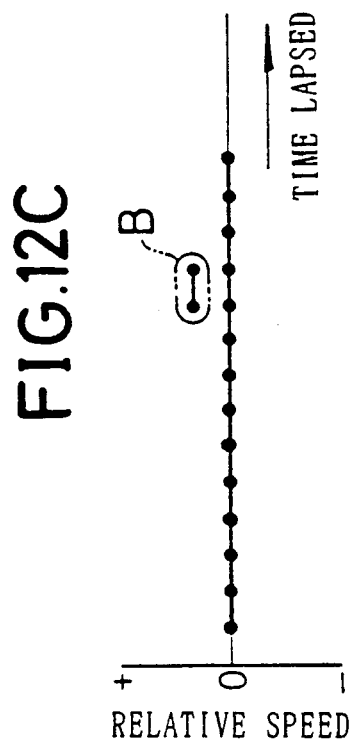

When noises due to the reflection from the road surface and a suspended matter are detected in a condition in which another vehicle as an objective obstacle is travelling ahead of the subject vehicle, as shown in FIG. 12A, the noises A and B can be detected, together with the ahead-travelling vehicle, as shown in FIG. 12B. The recognition of the ahead-travelling vehicle in distinction from the noises A and B enables the relative speed between the subject vehicle and the ahead-travelling vehicle to be continuously detected in distinction from the noises A and B, thereby eliminating the cause of the misoperation. It should be noted that the noise A is detected only once, as shown in FIG. 12B and hence, the relative speed, as shown in FIG. 12C, is not calculated.

On the contrary, in the prior art, a dispersion in relative speed is produced between the subject vehicle and the ahead-travelling vehicle, as shown in FIGS. 12D and 12E, notwithstanding that there is actually no variation in relative speed between the subject vehicle and the ahead-travelling vehicle. Therefore, it is impossible to correctly grasp the behavior of the ahead-travelling vehicle, thereby causing a misoperation.

Second advantage

When another vehicle has cut in between the ahead-travelling vehicle and the subject vehicle, as shown in FIG. 13A, the ahead-travelling vehicle and the cutting-in vehicle can be detected in distinction from each other, as shown in FIG. 13B. The relative speed between the ahead-travelling vehicle and the cutting-in vehicle can be detected individually, as shown in FIG. 13C, and therefore, the respective behaviors of the ahead-travelling vehicle and the cutting-in vehicle can be correctly determined, thereby eliminating the cause of the misoperation.

On the contrary, in the prior art, the relative speed is disordered, as shown in FIGS. 13D and 13E and, hence, the respective behavior of the ahead-travelling vehicle and the cutting-in vehicle cannot be correctly ascertained, thereby causing the misoperation.

Third advantage

Figure 14A:
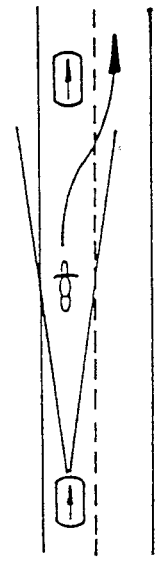
FIGS. 14A and 14B are diagrams illustrating characteristics obtained through the method of the present invention when a motorcycle runs past an ahead-travelling vehicle.

Suppose that, in a condition in which a four-wheel vehicle is travelling ahead of a motorcycle, in turn travelling ahead of the subject vehicle, as shown in FIG. 14A, which is a dangerous situation for collision, the motorcycle runs past the ahead-travelling four-wheel vehicle, as a result of a speed reduction of the four-wheel vehicle. In this case, both of the ahead-travelling four-wheel vehicle and the motorcycle are detected, as shown in FIG. 14B and, therefore, the ahead-travelling four-wheel vehicle can be always ascertained as an objective matter, irrespective of the presence and absence of the motorcycle.

Figure 14C:
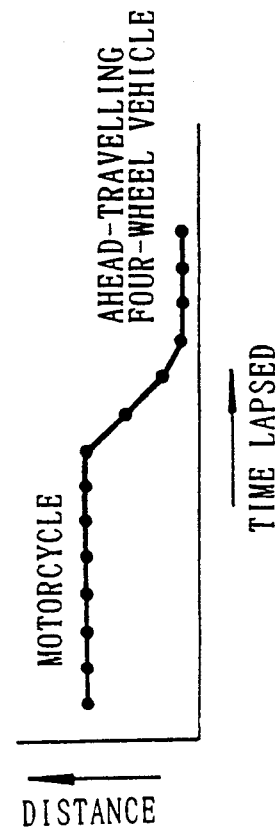
FIG. 14C is a diagram similar to FIG. 14B but of the prior art.
Figure 14B:
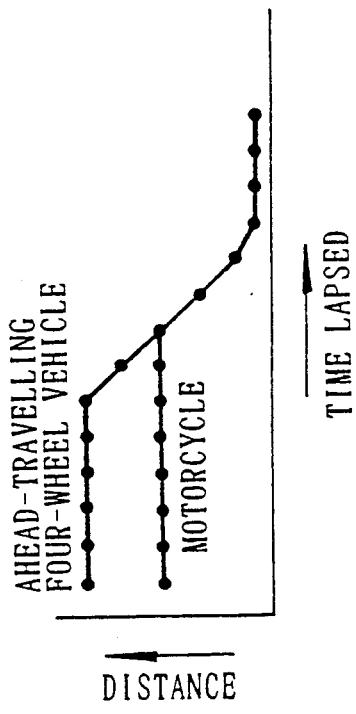

On the contrary, in the prior art, the presence of the ahead-travelling four-wheel vehicle cannot be grasped until the motorcycle runs away from between the subject vehicle and the ahead-travelling four-wheel vehicle, as shown in FIG. 14C and, hence, there is a possibility that the judgment of collision of the subject vehicle against the ahead-travelling four wheel vehicle is retarded.

Fourth advantage

Figure 15A:
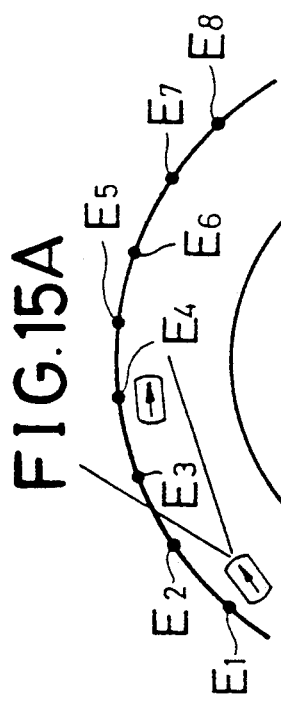
FIGS. 15A to 15C are diagrams illustrating characteristics obtained through the method of the present invention when the vehicle is travelling on a curved road.
Figure 15B:
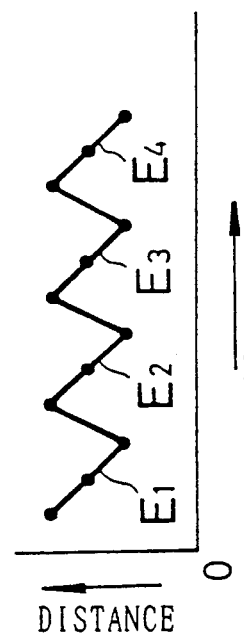
Figure 15C:
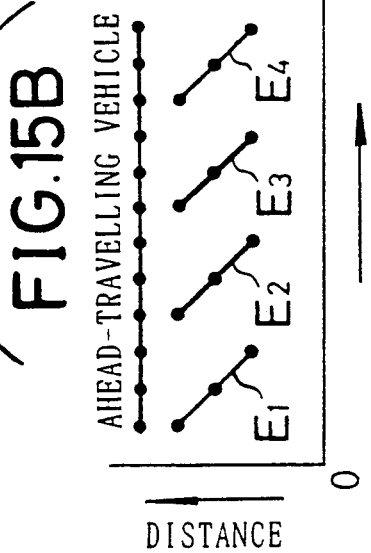

When the subject vehicle is travelling on a curved road, having corner reflectors $E_1$ and $E_s$, each of such reflectors $E_1$ to $E_s$, and the ahead-travelling vehicle, can be detected in distinction from each other, as shown in FIG. 15B. Therefore, the behavior of the ahead-travelling vehicle can be continuously detected in distinction from each of the reflectors $E_1$ to $E_s$.

Figure 15D:
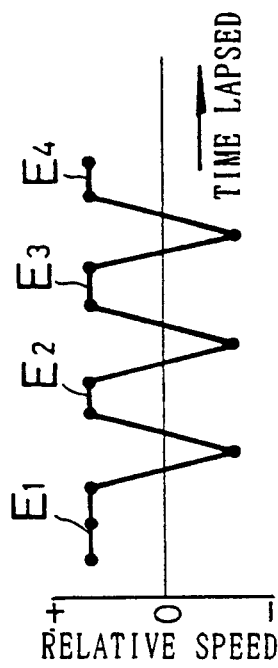
FIGS. 15D and 15E are diagrams similar to FIGS. 15B and 15C but of the prior art.
Figure 15E:
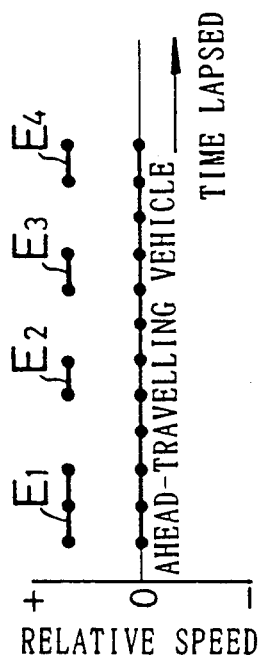

On the contrary, in the prior art the reflectors $E_1$ to $E_s$ are sequentially detected, as shown in FIGS. 15D and 15E and hence, not only the behavior of the ahead-travelling vehicle can be detected, but also there is a fear of a misoperation due to the dispersion in relative speed.

Although the embodiments of the present invention have been described in detail, it will be understood that the present invention is not limited to these embodiments, and various minor modifications can be made without departing from the spirit and scope of the invention defined in claims.

What is claimed is:

1. A method for estimating the relative speed between a vehicle and an objective obstacle, said vehicle being equipped with a distance measuring unit including a transmitting and receiving section capable of transmitting a signal toward the objective obstacle and receiving a reflected signal from the objective obstacle, and a calculating section for calculating the distance between the subject vehicle and the objective obstacle on the basis of the time between the transmission and the reception, said method comprising the steps of:

labeling a plurality of objective obstacle data provided in the distance measuring unit;

comparing an objective obstacle data preestimated on the basis of the past objective obstacle data with an objective obstacle data newly provided, thereby judging whether or not there is the same obstacle for every label;

determining the amount of variation in distance for every label by comparing the last data and the current or now data with regard to the objective obstacle data identified as being the same; and dividing such amount of variation in distance by a sampling time to provide a relative speed for every label.

2. A method for estimating the relative speed between a vehicle and an objective obstacle according to claim 1, wherein said signal transmitted toward said objective obstacle is a pulse signal having a predetermined extent and transmitted toward the objective obstacle, and an objective obstacle data is calculated for every reflected signal received within a given sampling time as a result of a single transmission of the pulse signal, said given sampling time being set shorter than a cycle of transmission of the pulse signal; said objective obstacle data is labeled, and the amount of variation in distance is divided by the cycle of transmission of said pulse signal to provide a relative speed for every label.

3. A method for estimating the relative speed between a vehicle and an objective obstacle, wherein said determining step derives the amount of variation in distance for every label from a distance between the positions of the respective centroids of the data for each of the labels.

* * * * *

UNITED STATES PATENT AND TRADEMARK OFFICE
CERTIFICATE OF CORRECTION

PATENT NO.  : 5,321,407
DATED       : June 14, 1994
INVENTOR(S) : KIKUCHI et al.

It is certified that error appears in the above-identified patent and that said Letters Patent is hereby corrected as shown below:

On the Title page, Item [30], line 2, "4-090250" should read --4-091250--.

Signed and Sealed this

Twenty-second Day of November, 1994

Attest:

BRUCE LEHMAN

Attesting Officer        Commissioner of Patents and Trademarks